CATHODE RAY TUBE SYSTEMS

Filed Aug. 3, 1953 2 Sheets-Sheet 1

INVENTORS
LESLIE E. FLORY
GEORGE W. GRAY
ARTHUR S. JENSEN
& WINTHROP S. PIKE
BY [signature]
ATTORNEY INVENTORS
LESLIE E. FLORY
GEORGE W. GRAY
ARTHUR S. JENSEN
& WINTHROP S. PIKE
BY [signature]
ATTORNEY United States Patent Office 2,892,056

Patented June 23, 1959

2,892,056

CATHODE RAY TUBE SYSTEMS

Leslie E. Flory, Princeton, George W. Gray, Lambertville, and Arthur S. Jensen and Winthrop S. Pike, Princeton, N.J., assignors to Radio Corporation of America, a corporation of Delaware Application August 3, 1953, Serial No. 372,120

8 Claims. (Cl. 178—7.2)

This invention relates to cathode ray tube systems and more particularly to systems wherein a tube of the cathode ray type is operated at radio frequencies.

In various types of cathode ray tube systems it is often desirable to operate the cathode ray tube at radio frequencies, that is, to obtain output signals therefrom as modulations of an RF carrier. As an example of a situation wherein such operation is desirable, it has been suggested that a camera attachment be provided for a television receiver of the broadcast type. Such a camera attachment is disclosed and claimed in the co-pending U.S. application of Flory, Pike and Gray, Serial No. 361,482, filed June 15, 1953, and entitled "Television System," For simplicity of equipment and economy of operation, it would be desirable to obtain as the output of the camera pickup tube an RF carried modulated with the developed video signals, which modulated carrier could be directly applied to the antenna terminal of the broadcast receiver. Advantage could thus be fully taken of the signal amplifying equipment in the receiver, with a minimum of equipment necessary for the camera attachment.

Another example of the desirability of RF operation of a cathode ray tube lies in operation of a cathode ray type storage tube such as the Radechon or the Graphechon type tubes. In the operation of such tubes there often arises difficulty in separating the desired output signal from other signals associated with storage tube equipment which tend to feed through directly to the tube's output circuit. As a means for satisfactorily separating the desired output signals, so-called RF signal operation has often been employed, whereby the desired output information appears as modulations of an RF carrier which may readily be separated from undesired signal frequencies by tuned circuits in the output lead.

A direct approach to the RF operation of a cathode ray tube is to apply an RF carrier to a beam intensity controlling electrode of the tube so as to modulate the beam with a carrier frequency signal to which the tube's output circuit is tuned. A serious drawback to this type of operation is the likelihood of direct feedthrough of the carrier signals from the source to the output circuit. Unless extreme shielding precautions are employed, a sizable direct feedthrough of carrier frequency signals due to radiation from the carrier source and associated electrodes will result in reduction of the percentage of modulation of the carrier by the desired signals to an unreasonably low level, as well as the introduction of phase shifts and other problems. However the present invention proposes a cathode ray tube system wherein RF operation of the tube is readily obtained with substantially no "feedthrough" problem and with a substantial reduction in the degree of shielding required.

In accordance with the present invention a pair of different carrier frequencies are applied to an electrode or several electrodes of the cathode ray tube, a nonlinear characteristic of the tube is relied upon to produce a heterodyning of the two carrier frequencies, and the signal output circuit is tuned to a beat frequency produced by the carrier heterodyning. There is, thus, no problem of shielding the low level output from the high level carrier source, since the high level carriers are all at different frequencies than the tuned frequency of the output circuit.

In accordance with one embodiment of the present invention, particularly suitable for cathode ray tubes of the low velocity scanning type, two carrier frequencies are carefully added without cross modulation and are supplied to both the control grid and cathode of the tube. The beam is subject to substantially only velocity modulation and the nonlinear target voltage-current characteristic of the tube is relied upon to produce the beat frequency.

In accordance with another embodiment of the present invention, the two carrier frequencies are carefully added without cross-modulation and are applied only to the control grid of the cathode ray tube. This produces substantially only amplitude modulation of the beam, and the nonlinear characteristic of the tube's electron gun is relied upon to produce the beat frequency.

The primary object of the present invention is therefore to provide a novel cathode ray tube system wherein RF operation of the cathode ray tube is readily and simply obtained.

A further object of the present invention is to provide a novel cathode ray tube RF operation system wherein the necessity of shielding the tube output circuit from the RF source is substantially eliminated.

An additional object of the present invention is to provide a novel cathode ray tube system of the type wherein the desired output appears as modulations of a carrier frequency, said novel system utilizing a nonlinear characteristic of the cathode ray tube to produce said carrier frequency.

A further and more specific object is to provide a novel camera pickup system whereby the output signal thereof comprises a modulated RF carrier which may be applied directly to the antenna terminal of a broadcast receiver.

Another more specific object of the present invention is to provide a novel storage tube system wherein RF signal separation may be employed without rigid shielding requirements.

Other objects and advantages of the present invention will become readily apparent to those skilled in the art upon a reading of the following detailed description and an inspection of the accompanying drawings in which.

Figure 1:
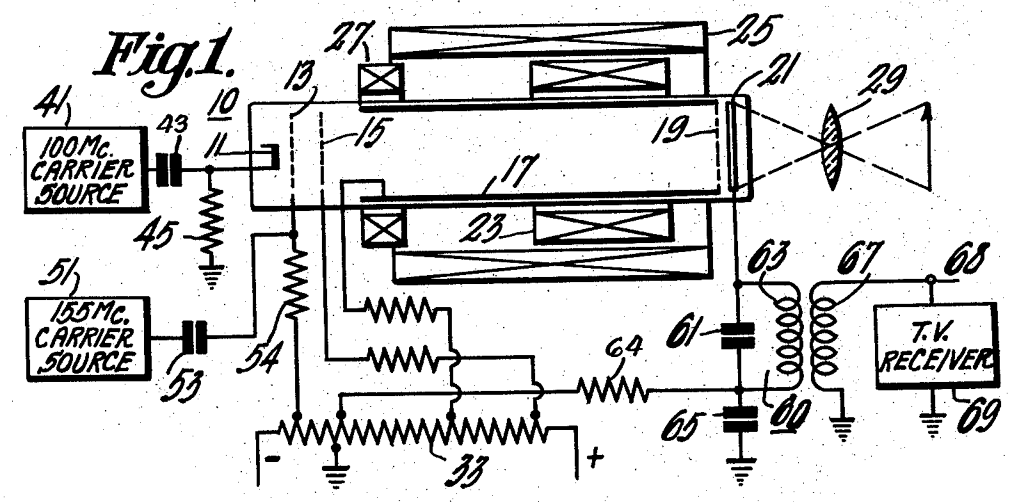
Fig. 1 illustrates in block and schematic form an embodiment of the present invention involving both amplitude and velocity modulation of a scanning beam in accordance with a pair of carrier frequency signals.

Referring to Fig. 1 in greater detail, there is illustrated a camera system employing a photoconductive pickup tube of the Vidicon type. A detailed description of the Vidicon tube may be found in the May 1950 issue of "Electronics" in an article entitled "The Vidicon—A Photoconductive Camera Tube" by Weimer, Forgue, and Goodrich, and in the March 1952 issue of the "RCA Review" in an article entitled "Performance of the Vidicon, a Small Developmental Television Camera Tube" by Vine, Janes and Veith.

The pickup tube 10, as illustrated, includes a conventional electron gun structure, comprising a thermionic cathode 11, a control grid 13 and an accelerating grid 15, for generating an electron beam. The target structure 21 of the tube comprises a signal plate, a transparent conducting film on the inner surface of the tube's face plate, and a light sensitive element consisting of a thin layer of photoconductive material deposited on the signal plate.

Each element of the photoconductive layer is an insulator in the dark but becomes slightly conductive when it is illuminated and acts like a leaky capacitor having one plate at the fixed positive potential of the signal electrode and the other plate floating. When light from the scene being televised is picked up by an optical lens system 29 and focused on the photoconductive-layer surface next to the tube faceplate, each illuminated layer element conducts slightly depending on the amount of illumination on the element and thus causes the potential of its opposite surface (on the gun side) to rise in less than the time of one frame toward that of the signal-electrode potential. Hence, there appears on the gun side of the entire layer surface a positive potential pattern, composed of the various element potentials, corresponding to the pattern of light from the scene imaged on the opposite surface of the layer.

The gun side of the photoconductive layer is scanned by a low velocity electron beam produced by the electron gun 11—13—15 and deflected by the conventional action of the deflecting coils 23. The beam is focused at the surface of the photoconductive layer by the combined action of the uniform magnetic field of the external focusing coil 25 and the electrostatic field of the focusing electrode 17 (which may comprise a conductive wall coating). A fine mesh screen 19 located adjacent to the photoconductive layer and connected to the focusing electrode 17, serves, when suitably energized as indicated, to provide a uniform decelerating field between itself and the photoconductive layer so that the electron beam will approach the layer in a direction perpendicular to it.

When the gun side of the photoconductive layer with its positive potential pattern is scanned by the electron beam, electrons are deposited from the beam in sufficient quantities until the surface potential is reduced to that of the cathode, and the remaining undeposited electrons are turned back to form a return beam which is generally not utilized. Deposition of electrons on the scanned surface of any particular element of the layer causes a change in the difference of potential between the two surfaces of the element. When the two surfaces of the element, which in effect is a charged capacitor, are connected through the external signal-electrode circuit and the scanning beam, a capacitive current is produced and constitutes the video signal. The magnitude of the current is proportional to the surface potential of the element being scanned and to the rate of scan.

Operating potentials for the various electrodes of the tube may be obtained from a suitable source, as by connection to the voltage divider 33. In accordance with the present invention a pair of carrier frequency sources, 41 and 51 are provided. Source 41, which may for example provide a carrier frequency of 100 megacycles, is coupled via capacitor 43 to the cathode 11, which is returned to ground by resistor 45. Source 51, which may for example provide a carrier frequency of 155 megacycles, is coupled via capacitor 53 to the control grid 13, which is returned to a suitable tap on the voltage divider 33 through a resistor 54. The signal output circuit, which is coupled to the signal plate of the target structure 21 includes a parallel resonant circuit 60, comprising capacitor 61 in shunt with the inductance coil 63. The lower end of the resonant circuit 60 is connected through resistor 64 to a point on the voltage divider 33 to provide the target operating potential, as previously discussed, and this end is also coupled to ground by way of a bypass capacitor 65.

The resonant circuit 60 is tuned to a beat between the two applied carriers. As an example, the tuned circuit 60 may be resonant at the difference frequency of 55 megacycles which closely approximates the picture carrier frequency assigned to television channel 2. It will be appreciated that the specific frequencies designated in this description are given by way of example only and the invention should not be considered as limited thereto. Thus for example, in actual utilization in a camera attachment, the source frequencies might rather be chosen to have a frequency difference corresponding more exactly to an assigned picture carrier frequency. Output signals may be derived from the resonant circuit 60, as by the output coil 67 inductively coupled to the coil 63. Where the Vidicon apparatus is to serve as a camera attachment for a broadcast receiver, the output coil 67 may be directly connected to the antenna terminal 68 of a broadcast type television receiver 69.

In the embodiment illustrated in Fig. 1, the 55 megacycle beat frequency appears on the scanning beam of the pickup tube 10 due to the nonlinear control voltage versus beam current characteristic of the electron gun. The video signals representative of the scanned image appear in the output circuit 60 as amplitude modulations of the beat frequency carrier. Direct feed through of the 100 megacycle and 155 megacycle carrier waves is substantially avoided since the response of the resonant circuit 60 is quite low for these frequencies. The modulated carrier output derived from the resonant circuit 60 may be directly utilized by the broadcast receiver 69, simply by tuning the receiver to channel 2.

Figure 2:
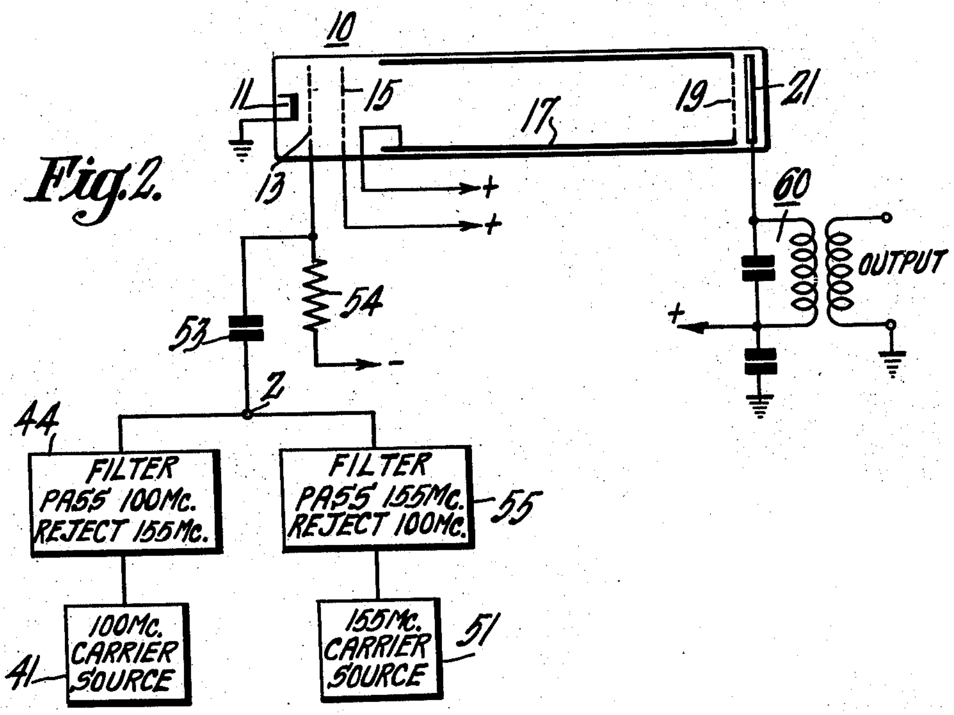
Fig. 2 illustrates in block and schematic form another embodiment of the present invention involving amplitude modulation alone of a scanning beam in accordance with a pair of carrier frequency signals.

A modification of the arrangement illustrated in Fig. 1 is shown in Fig. 2. The cathode 11 of the pickup tube 10 is grounded and the two carrier frequencies are both applied to the control grid 13. To insure that cross-modulation between the two carrier sources does not occur with resultant production of the beat frequency in the external circuits, the carrier adding means may include suitable filters 44 and 55 through which the respective carriers are coupled to the summing point "Z." Thus the 100 megacycle carrier source 41 is coupled to the summing point "Z" by a filter 44 which readily passes 100 megacycles but strongly rejects 155 megacycles. Similarly the 155 megacycle carrier source 51 is coupled to the summing point "Z" by a filter 55 which readily passes 155 megacycles but strongly rejects 100 megacycles. The summing point "Z" is coupled to the control grid 13 by the capacitor 53. As in the embodiment of Fig. 1 the target ouput circuit includes the parallel resonant circuit 60, tuned to the difference beat frequency of 55 megacycles.

The embodiment of Fig. 2, wherein cathode 11 remains at a fixed potential, involves substantially no velocity modulation of the scanning beam and produces a beat frequency by means of amplitude modulation of the beam alone. This contrasts with the arrangement of Fig. 1 wherein swings of the cathode 11 with carrier waves from source 41 result in velocity modulation of the beam as well as amplitude modulation. While the presence of velocity modulation is not necessarily objectionable in low velocity scanning tubes such as the Vidicon, it may prove a disadvantage in the operation of high velocity scanning tubes, such as the Radechon, where velocity modulation may result in changes in deflection sensitivity and consequent adverse effects on picture resolution. Thus the embodiment of Fig. 2 in which velocity modulation is absent will be particularly suitable for use in systems such as the Radechon storage tube systems where it is desired to practice RF signal separation without adversely affecting resolution.

On the other hand, it has been noted that in the use of either of the embodiments illustrated in Figs. 1 and 2 with low velocity scanning Vidicons, there is a tendency to produce negative pictures with changes in light level or any change in operating conditions. While it is not certain what is the cause of this negative picture effect, it has been theorized that there is a radio frequency component to the space charge near the target which leads to a capacitive pickup of the beat frequency. Since this pickup is out of phase with the direct pickup due to landing of electrons on the target, it can cause a reverse modulation of the carrier and thus negative pictures. Since the radio frequency component in the space charge is produced by amplitude modulation of the beam, an embodiment of the invention not requiring amplitude modulation was shown to give completely positive pictures. Such an embodiment has been illustrated in Fig. 3 of the drawings. The carrier wave outputs from sources 41 and 51 are again carefully added, with precaution taken to avoid any cross modulation, but the sum is applied to both the cathode and the control grid of the electron gun. Thus, as illustrated, source 41 is again coupled to the summing point "Z" through filter 44, and source 51 is coupled to the summing point "Z" through the filter 55. The two carrier waves are again both applied via a capacitor 53 to the control grid 13. The control grid 13 however is also coupled by way of the capacitor 59 to the cathode 11, which is returned to ground through resistor 45. As a result of simultaneous application of the two carrier waves to both cathode and grid, substantially no amplitude modulation of the scanning beam occurs. However, since the cathode 11 is no longer at a fixed potential but rather swings in accordance with the two carrier waves, velocity modulation of the beam does ensue. Since the target voltage versus target current characteristic has essentially the same characteristic as the grid voltage versus beam current, the velocity modulation will also produce the desired beat frequency, but the space charge effects which were apparently responsible for the negative pictures are eliminated. Thus, the embodiment illustrated in Fig. 3 is to be preferred where RF operation of low velocity scanning tube such as the Vidicon is desired, as in the home receiver camera attachment utilization illustrated by Fig. 1.

Figures 3, 4:
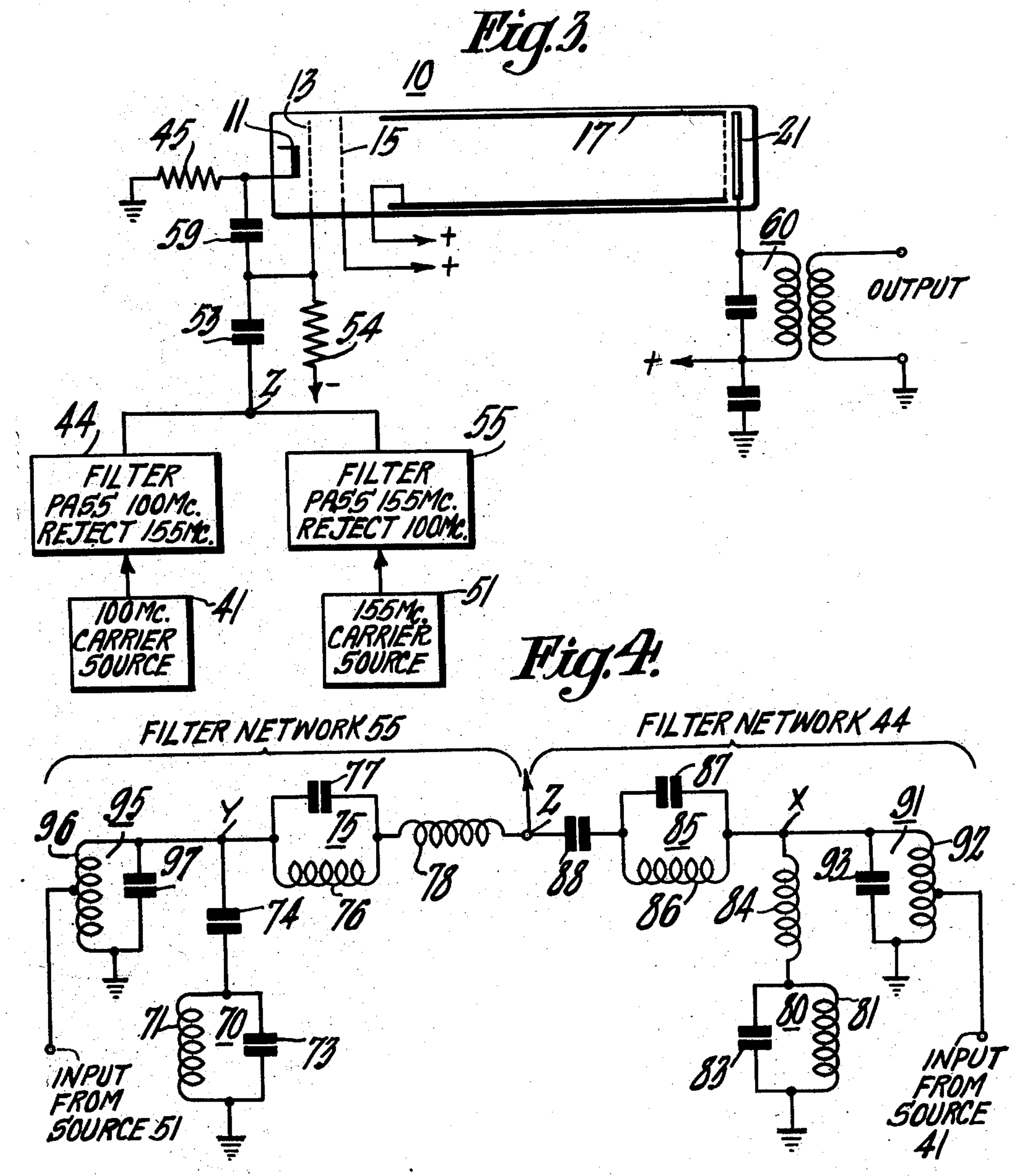
Fig. 3 illustrates in block and schematic form a further embodiment of the present invention involving velocity modulation alone of a scanning beam in accordance with a pair of carrier frequency signals.
Fig. 4 illustrates schematically details of a filter network which may be incorporated in the carrier adding means of Figures 2 and 3.

Fig. 4 illustrates a particularly advantageous form which the filter networks 44 and 55 may take in embodiments such as those shown by Figs. 2 and 3 wherein it is desired to carefully add the outputs of two carrier sources without cross modulation.

The filter network 44, as illustrated, effectively provides a voltage divider between the summing point "Z" and ground, for which the voltage division about the intermediate point "X" is markedly different at the two source frequencies. This may be more readily appreciated by considering the details of the network branches.

The summing point "Z" is connected to the intermediate point "X" via a capacitor 88 in series with a parallel resonant circuit 85, comprising a coil 86 in shunt with a capacitor 87. The tank circuit 85 is parallel resonant at 155 megacycles. However at 100 megacycles, the tank circuit 85 appears essentially as an inductance, and the capacitor 88 is chosen in relation thereto such that the combination is series resonant at 100 megacycles.

The intermediate point "X" is connected to ground through two parallel network branches, one branch comprising a parallel resonant circuit 91, including the coil 92 in shunt with a capacitor 93. The 100 megacycle carrier frequency waves from source 41 are applied to the tank circuit 91 at a tapped point on the coil 92. The network branch shunting the resonant circuit 91 includes a coil 84 in series with a parallel resonant circuit 80, comprising a coil 81 in shunt with a capacitor 83. The tank circuit 80 is parallel resonant at 100 megacycles. However, at 155 megacycles the tank circuit 80 appears essentially as a capacitance, and the coil 84 is chosen in relation thereto such that the combination is series resonant at 155 megacycles.

Thus at 100 megacycles (the frequency of source 41) the filter network 44 presents a high impedance between point "X" and ground, and an effective short circuit between point "X" and the summing point "Z." The carrier frequency waves from source 41 thus appear stepped up in voltage at point "X," and, with little attenuation present between point "X" and the summing point "Z," appear at summing point "Z" at a relatively high level. On the other hand, at 155 megacycles (the frequency of source 51) the filter network 44 presents a high impedance between the summing point "Z" and point "X," and an effective short circuit between point "X" and ground through the aforementioned series resonant circuit. Thus carrier frequency waves from source 51 which may appear at the summing point "Z" at a high level are strongly attenuated between the point "Z" and point "X," and the further provision of the short circuit path through the series resonant branch between point "X" and ground insures that the 155 megacycle carrier waves will be completely absent from the current flowing through the input coil 92.

The filter network 55, in a similar manner, serves as the complement to the filter network 44. It thus includes a network branch between the summing point "Z" and an intermediate point "Y" which presents a high attenuating impedance to the waves from source 41 due to the inclusion of the parallel resonant circuit 75 tuned to 100 megacycles, but which also appears as a short circuit to the carrier waves from source 51 due to the series resonance tuning of the branch to 155 megacycles. The network between the intermediate point "Y" and ground includes a branch comprising the parallel resonant circuit 95, which includes the coil 96 in shunt with the capacitor 97, the source 51 being coupled to an intermediate point on the coil 96. The tank circuit 95 is shunted by a network branch which, though presenting a high impedance to the carrier waves from source 51 due to the inclusion of the resonant circuit 70 tuned to 155 megacycles, effectively short circuits the carrier waves from source 41 to ground due to the series resonance tuning of the branch to 100 megacycles. It will thus be appreciated that the filter 55, in a manner similar to that of the filter network 44, permits carrier waves from the associated source to appear at a high level at the summing point "Z," but substantially attenuates and bypasses any feedthrough of carrier waves from the other source.

While it may be appreciated that the presence of the series resonant branches between the respective points "X" and "Y" and ground provides additional assurance against cross modulation, these branches may alternatively be omitted for simplification without undue hardship, particularly where the resonant circuits 91 and 95 have high Q's.

The filter networks 44 and 55 as just described thus provide an effective means for adding the two carrier waves with substantially no possibility of cross modulation between the two carrier sources. It will be readily appreciated that, while the circuit arrangement illustrated in Fig. 4 is particularly effective in performing this function, other simpler forms of linear signal adding means are also contemplated for use in the RF operation systems illustrated in Figs. 2 and 3.

There has thus been described a novel system for effecting RF operation of a cathode ray tube, involving the use of nonlinear characteristics of the cathode ray tube for producing the carrier frequency to which the tube's output circuit is selectively responsive. The several embodiments which have been described are suitable for various forms of utilization of the RF operation technique. The indicated utilization of the novel RF operation technique in a camera attachment for a broadcast television receiver may readily prove of advantage in a closed circuit television system of the type disclosed in the aforementioned co-pending application of Flory, Pike and Gray. Thus, for example, the power, deflection, blanking and other requirements of the camera tube 10 illustrated in Fig. 1 may readily be derived from the receiver apparatus 69 in accordance with the principles of the invention disclosed in the aforesaid co-pending application.

Having described the invention, what is claimed is:

1. In a cathode ray tube system wherein there is provided an electron beam source, an electron target and an enclosed beam path between said source and said target, the combination comprising a first source of carrier frequency waves of a first frequency, a second source of carrier frequency waves of a second frequency, means for linearly combining carrier frequency waves from both of said sources, means for effecting velocity modulation of said beam, to the substantial exclusion of intensity modulation of said beam, in accordance with the linear combination of the carrier frequency waves from both of said sources, and a signal output circuit coupled to said electron target and selectively responsive to a beat between the carrier waves of said two sources.

2. In a cathode ray tube system including means for generating an electron beam, an electron target, means for scanning said target with said beam, and means for deriving an output signal from the scansion of said target with said beam, the combination comprising a first source of carrier frequency waves of a first frequency, a second source of carrier frequency waves of a second frequency, and means for effecting velocity modulation of said beam, to the substantial exclusion of intensity modulation of said beam, in accordance with carrier frequency waves from both of said sources, said signal deriving means including means selectively responsive to the difference between said first and said second frequencies.

3. In a cathode ray tube system including means for generating an electron beam, an electron target, means for scanning said target with said beam, and means for deriving an output signal from the scansion of said target with said beam, the combination comprising a first source of carrier frequency waves of a first frequency, a second source of carrier frequency waves of a second frequency, means for adding the carrier frequency waves from both of said sources, and means for effecting velocity modulation of said beam, to the substantial exclusion of intensity modulation of said beam, in accordance with the output of said adding means, said signal deriving means including means selectively responsive to the difference between said first and said second frequencies.

4. In a camera attachment for a television receiver the combination comprising a cathode ray tube for generating an electron beam including a cathode, a control grid, and an electron target, means including said cathode and said control grid for scanning said target with said beam, a first source of carrier frequency waves of a first frequency, a second source of carrier frequency waves of a second frequency, means for adding the carrier frequency waves from both of said sources, means for applying the output of said adding means to both said cathode and said control grid, and a signal output circuit coupled to said target and selectively responsive to a beat between said first and second carrier frequencies.

5. In a camera attachment for a broadcast television receiver, the combination comprising a pickup tube for generating an electron beam including a cathode, a control grid, and a target structure, means including said cathode and said control grid for scanning said target structure with said beam, a first source of carrier frequency waves of a first frequency, a second source of carrier frequency waves of a second frequency, means for coupling both said cathode and said control grid to a common signal point, means for coupling said first source to said common signal point, means for coupling said second source to said common signal point, and a signal output circuit coupled to said target structure, said output circuit being selectively responsive to a beat between said first and second frequencies.

6. A combination in accordance with claim 5 wherein, said means for coupling said first source to said common signal point includes a filter network which passes said first frequency and rejects said second frequency, and wherein said means for coupling said second source to said common signal point includes a filter network which passes said second frequency and rejects said first frequency.

7. In a cathode ray tube system including a cathode, a control grid, and an electron target for generating an electron beam, said system including means for scanning said target with said beam, the combination comprising a first source of carrier frequency waves of a first frequency, a second source of carrier frequency waves of a second frequency, filter means for coupling said first source to said cathode and said control grid, said first frequency being within the passband of said filter means and said second frequency being outside the passband of said filter means, additional filter means coupling said second source to said cathode and said control grid, said first frequency being outside the passband of said additional filter means and said second frequency being within the passband of said additional filter means, and a signal output circuit coupled to said cathode ray tube, said signal output circuit being selectively responsive to a beat between said first and second carrier frequencies.

8. Apparatus in accordance with claim 7 wherein said combination additionally comprises means including said first-named filter means for coupling said first source to said cathode, and means including said additional filter means for coupling said second source to said cathode.

References Cited in the file of this patent

UNITED STATES PATENTS

| | | |
|---|---|---|
| 1,988,621 | Hansell | Jan. 22, 1935 |
| 2,241,204 | Keyston et al. | May 6, 1941 |
| 2,280,026 | Brown | Apr. 14, 1942 |
| 2,301,820 | Schlesinger | Nov. 10, 1942 |
| 2,401,010 | Mayle | May 28, 1946 |
| 2,532,793 | Sziklai | Dec. 5, 1950 |
| 2,553,566 | Ferguson | May 22, 1951 |
| 2,623,167 | Diemer et al. | Dec. 23, 1952 |

FOREIGN PATENTS

| | | |
|---|---|---|
| 611,222 | Great Britain | Oct. 27, 1948 |